May 6, 1930. T. G. RENNERFELT 1,757,476

FRICTION GEARING

Filed May 28, 1928

Ture Gustaf Rennerfelt
INVENTOR

Patented May 6, 1930

1,757,476

UNITED STATES PATENT OFFICE

TURE GUSTAF RENNERFELT, OF STOCKHOLM, SWEDEN

FRICTION GEARING

Application filed May 28, 1928, Serial No. 281,171, and in Sweden November 26, 1927.

My invention relates to improvements in friction gearing of the type in which power is transmitted from a shaft to another through the medium of convex rollers which are pressed against a concave race ring by a concave friction pinion mounted on one of the shafts. Examples of such gearing are shown in my Patents 1,399,442 and 1,399,443 granted 1921. The object of the invention is to provide a gearing of said type which shall have a higher efficiency, and be more reliable in operation. To gain this object I arrange my improved gearing in such manner that the pressure between the pinion and a roller is of constant magnitude, independent of any end thrust accidentally acting on a shaft, and directed substantially at right angle to the centre line of the pinion. Other novel features of the gearing are described in the following specification. The size of the rollers is such that the smallest diameter of the pinion together with twice the diameter of a roller is greater than the diameter of the race ring, so that when the gearing is assembled the rollers must be squeezed or forced into their places between the pinion and the race ring. The rollers are then to some extent compressed, but well within the elastic limit. When the rollers are thus placed, the pressure on a roller is directed exactly at right angle to the centre line of the pinion, but the magnitude of the said presure is uncertain, and will generally be too small for the reliable operation of the gearing. The said pressure is increased to a certain and definite magnitude by applying some pressure on the pinion in axial direction as herein further described. It is evident that a very high pressure on the rollers can be obtained by a small pressure on the pinion, and that this relatively small end pressure will not appreciably alter the direction—at right angle to the shaft—of the pressure between pinion and roller. To prevent slipping or overload of the rollers it is necessary that the pressure on the rollers shall be of proper and of constant magnitude.

Figure 1:
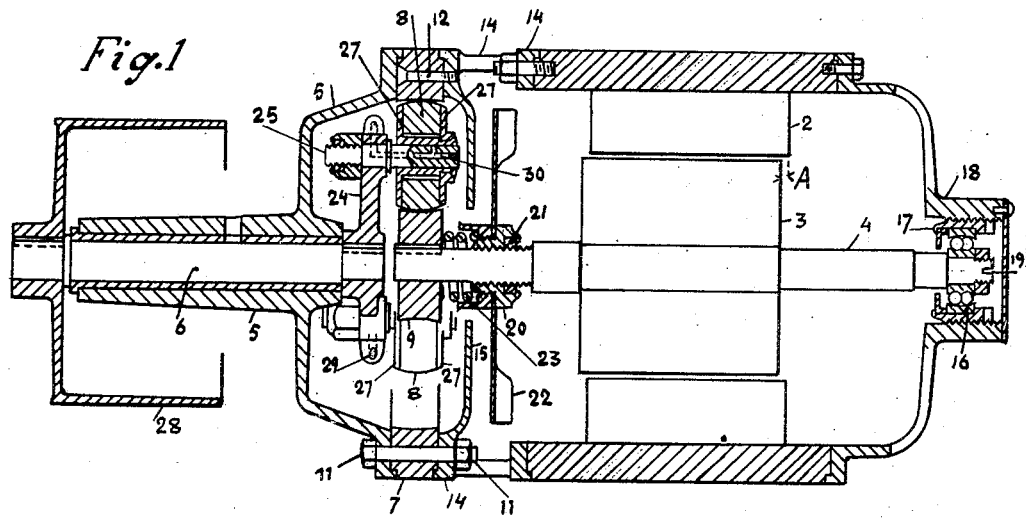
Figure 3:
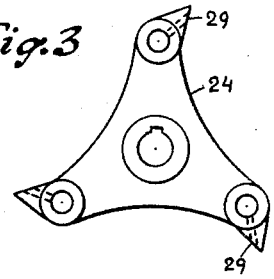
Figure 2:
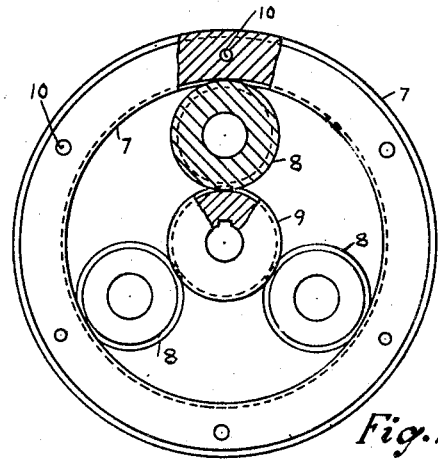

The invention is illustrated in the accompanying drawing, in which Fig. 1 is a longitudinal section of the gearing applied to an electric motor or dynamo. Fig. 2 is an end-view partly in section of the race ring with rollers and pinion. Fig. 3 shows a detail, termed a yoke.

Referring to the drawing 2 denotes the stator of the motor, 3 its rotor, 4 its shaft, 5 a cast bearing fastened to the motor, and 6 another shaft in substantial alinement with shaft 4. The race ring is denoted with 7, the convex rollers with 8, and the friction pinion with 9. The race ring 7—preferably with spherical running face and with a diameter as large as space and other conditions will admit—is formed with holes 10, so that it may be fastened by bolts 11, 12 to the bearing 5 and to a bracket 14 attached to the motor. The bracket is cast with a shield 15 arranged to form with the bearing 5 a reservoir for oil. The race ring may in some cases be formed integrally with the bracket, but is preferably of hardened steel. One end of the shaft 4 is journalled in a ballbearing for sustaining thrust in either direction; the outer ring of this bearing is encased in a sleeve 17 which is threaded in the bearing bracket 18. The end of the shaft is formed with a slot 19.

A nut 20, containing a fibre cushion 21 so as to make it selflocking, is threaded on the shaft, and attached to the nut is a fan 22 arranged to cool the windings of the motor. A spiral spring 23 is compressed between the nut and the pinion 9, which is slidably keyed to the shaft 4, and supported by the three rollers 8. A yoke 24 is fastened to shaft 6, and three studs 25 secured in the yoke substantially parallel with the shaft. A hub within the roller 8 is journalled on the stud, and formed with two cheeks 27, 27 arranged to be in sliding contact with the end faces of the roller, so as to retain its axis parallel to the stud. The roller is hollow, and its inside diameter is greater than the diameter of the hub upon which it is mounted, so that the roller can rotate around a free axis. The roller is also free to slide with the hub on the stud, so that the roller makes contact at the smallest diameter of the pinion, and at the largest diameter of the race ring. 28 denotes a pulley fastened to shaft 6.

The above mentioned end pressure on the pinion—necessary in order that the gearing may without slip transmit the full power of the motor—is applied in the following manner: The nut 20 is held stationary, and the shaft 4 is turned as by means of the slot 19; by this operation the spring is compressed, and exerts the proper pressure on the pinion. In gearings of large size the spring may be omitted, the pinion may rest against a shoulder on the shaft 4, and the pressure on the pinion may be obtained by turning the threaded sleeve 17. In such case the desirable elasticity in the gearing will be supplied by the ringshaped flexible rollers 8 and by the race ring. In small sized gearings the expensive ball bearing, within the sleeve 17 may be replaced by a simple stud bearing sustaining thrust in merely one direction, and in this case the rotor should be located unsymmetrically in relation to the stator as indicated at A in Fig. 1, so that any magnetic traction upon the rotor in axial direction shall be sustained by the stud bearing, and not affect the pressure on the rollers.

The lubrication of a stud 25 is effected through hole 29 in the yoke, and through a hole 30 drilled through a stud. The rollers 8 and pinion 9 are preferably of hardened steel. The parts 7, 14, 2 and 18 may be considered as parts of a frame for the gearing.

Having thus described my invention, what I claim is:

1. In a friction gearing the combination of a fame, two shafts journaled therein, a concave pinion mounted on one of the shafts, a concave race ring held within the frame, a plurality of convex rollers pressed between the pinion and the race ring, a plurality of studs fastened to the other shaft, a hub journalled on a stud within a roller, the hub formed with cheeks in contact with the ends of the roller, and means for rotating one of the shafts.

2. In a friction gearing the combination of two shafts, a concave pinion mounted on one of the shafts, a concave race ring, a plurality of convex rollers pressed between the pinion and the race ring, electromagnetic means for rotating one of the shafts, means for preventing magnetic traction on the shaft from affecting the pressure on a roller, and an operative connection between the rollers and the other shaft.

3. In a friction gearing the combination of a frame, a sleeve threaded in the frame, a ball bearing encased within the sleeve, a shaft resting with one end in the ball bearing, a friction pinion mounted on the other end of the shaft, a race ring within the frame, a plurality of convex rollers pressed between the pinion and the race ring, a second shaft within the frame, connection between the rollers and the second shaft, and means for rotating one of the shafts.

4. In a friction gearing the combination of a shaft, a friction pinion slideably mounted on the shaft, a nut threaded on the shaft, a spring between the pinion and the nut, a race ring, a plurality of convex rollers between the pinion and the race ring, a second shaft, connection between the rollers and the second shaft, and means for rotating one of the shafts.

5. In a friction gearing the combination of two shafts, a friction pinion mounted on one of the shafts, a race ring, a plurality of convex rollers pressed between the pinion and the race ring, a second shaft, a yoke fastened to the second shaft, a plurality of studs fastened to the yoke, a hub within a roller journalled on a stud, a hole through the stud, a hole in the yoke, said holes communicating so as to convey oil to the hub, and a connection between the rollers and the second shaft.

6. In a friction gearing the combination of a frame, two shafts journalled therein, a concave friction pinion mounted on one of the shafts, a concave race ring within the frame, a plurality of convex rollers pressed between the pinion and the race ring, a yoke fastened to the other shaft, a plurality of studs mounted in the yoke, a pair of cheeks journalled on a stud and in contact with a roller, and means for rotating one of the shafts.

7. In a friction gearing the combination of two shafts, a concave pinion mounted on one of the shafts, a concave race ring, a plurality of convex rollers pressed between the pinion and the race ring, each roller arranged to be rotated around a free axis, means for retaining the said axis parallel to a shaft, an operative connection between the other shaft and the rollers, and means for rotating one of the shafts.

8. In a friction gearing the combination of two shafts, a concave pinion mounted on one of the shafts, a concave race ring, a plurality of convex rollers pressed between the pinion and the race ring, a yoke fastened to the other shaft, a plurality of studs mounted in the yoke, a hub within each roller rotatably mounted on a stud, the hub having a cheek in contact with the end face of a roller, and being arranged to slide along the stud so as to permit the roller to make contact at the largest diameter of the race ring.

9. In a friction gearing the combination of a frame, two shafts journalled therein, a concave friction pinion mounted on one of the shafts, a concave race ring within the frame, a plurality of convex rollers pressed between the pinion and the race ring, a yoke fastened to the other shaft, a stud within a roller fastened to the yoke, means carried by the yoke and applied to the end of a roller for limiting the variation in the position of a roller relatively to a stud, and means for rotating one of the shafts.

10. In a friction gearing the combination of a frame, two shafts journalled therein, a friction pinion mounted on one of the shafts, a race ring within the frame, a plurality of rollers pressed between the pinion and the race ring, the pressure between a roller and the pinion directed substantially at right angle to a shaft, a yoke fastened to the other shaft, a stud within a roller fastened to the yoke, means carried by the yoke and applied to the end of a roller for limiting the inclination of a roller relatively to a stud, and means for rotating one of the shafts.

Signed at Stockholm in the county of Stockholm and Kingdom of Sweden this 14th day of May, A. D. 1928.

TURE GUSTAF RENNERFELT.